US012754825B2

(12) United States Patent
Telkar et al.

(10) Patent No.: US 12,754,825 B2
(45) Date of Patent: Oct. 6, 2026

(54) SYSTEM AND METHOD FOR TEST DATA HEALING

(71) Applicant: SAP SE, Walldorf (DE)

(72) Inventors: Prashant Telkar, Bangalore (IN); Meldon Malcolm Dcunha, Mumbai (IN); Manan Dey, Guwahati (IN); Shwetha Kamath B M, Bangalore (IN); Vishwas Agrawal, Mandla (IN); Anjali Mishra, Delhi (IN)

(73) Assignee: SAP SE, Walldorf (DE)

( * ) Notice: Subject to any disclaimer, the term of this patent is extended or adjusted under 35 U.S.C. 154(b) by 252 days.

(21) Appl. No.: 18/606,106

(22) Filed: Mar. 15, 2024

(65) Prior Publication Data

US 2025/0291705 A1 Sep. 18, 2025

(51) Int. Cl.
*G06F 9/44* (2018.01)
*G06F 11/3668* (2025.01)
*G06F 40/194* (2020.01)

(52) U.S. Cl.
CPC ........ *G06F 11/3684* (2013.01); *G06F 40/194* (2020.01)

(58) Field of Classification Search
CPC ........................... G06F 11/3684; G06F 40/194
See application file for complete search history.

(56) References Cited

U.S. PATENT DOCUMENTS

2009/0133033 A1* 5/2009 Lindo ................. G06F 11/3624 718/108
2011/0238878 A1* 9/2011 Welguisz ................ G06F 13/24 710/262
2018/0267884 A1* 9/2018 Dhanda ................. G06F 11/368
2019/0287016 A1* 9/2019 Katoh .................... G06N 20/00

* cited by examiner

*Primary Examiner* — Qamrun Nahar
(74) *Attorney, Agent, or Firm* — Buckley, Maschoff & Talwalkar LLC

(57) ABSTRACT

According to some embodiments, systems and methods are provided including a test data repository storing test data; a memory storing processor-executable program code; and a processing unit to execute the processor-executable program code to cause the system to: change a state of the stored test data from a first state to a second state in response to execution of test executable code, the execution using the first state test data; store the second state test data; detect a difference between the first state test data and the second state test data by comparing the stored second state test data to the first state test data; and restore the stored second state test data to the first state test data. Numerous other aspects are provided.

20 Claims, 13 Drawing Sheets

SYSTEM AND METHOD FOR TEST DATA HEALING

BACKGROUND

Many organizations are increasingly dependent on software applications, executed on-premise or in the cloud, that are developed by an application development group to address their needs. These applications may be tested by test tools to verify functional and/or non-functional requirements via test scripts (e.g., test executable code) that test the different aspects of a given application. The test tools may create and manage various functional test data including, but not limited to, sales orders, employee data, partner data, and other suitable transactional data etc. to execute the tests. The test data may be in a single pool and used by different sub-groups over different areas for execution of the test scripts for validation and verification purposes with respect to the different applications. For example, Test Sub-Group A may use a set of data (e.g., including employee id and home state) to test Application A and Test Sub-Group B may use the same set of data to test Application B. During the course of execution of the tests, a status of the test data may change. As a non-exhaustive example, a test script may change a status of a sales order from "open" sales order to "closed" sales order, or may change an amount of a particular item stored in the system (e.g., after completion of a sales order, 10 widgets is now 5 widgets). The changed status may be problematic as it may cause substantial inconsistencies when the testers need the same test data in an original state during daily test activities like regression testing, unit tests or integration tests. As a result, testers may face challenges in the accuracy of the testing activities and may spend considerable effort in creating and maintaining the test data and its state.

Systems and methods are desired to maintain data during testing.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
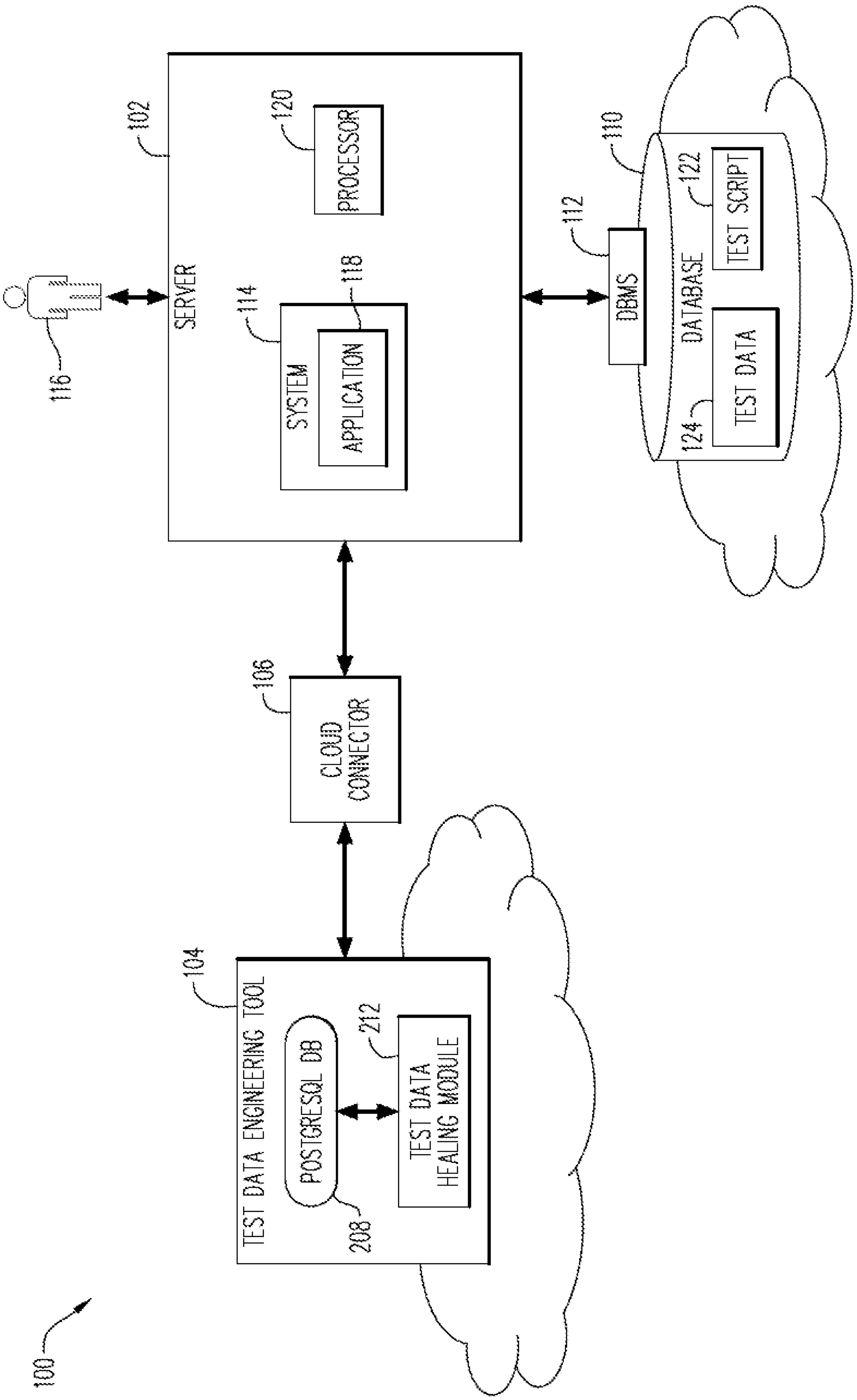
FIG. 1 is a block diagram of an architecture according to some embodiments.

Throughout the drawings and the detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein. It should be appreciated that in development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

As described above, applications for organizational processes may be tested (functional and/or non-functional) by a test script (test executable code) to ensure the application is operating as expected. As used herein, the terms "automated test script," "test executable code", "automate", "test" "test script" and "automation" may be used interchangeably.

The elements tested by the test script may include business objects. A business object is the representation of a business entity, like an employee or sales order. The business object may encompass both the functionality (in the form of methods) and the data (in the form of attributes) of this entity. As used herein the business object ("object") may refer to the metadata defining a semantic entity (e.g., SalesOrder) and a business object instance ("object instance") may refer to the data of an actual Sales Order (e.g., Sales Order 123), which conforms to the structure defined by the metadata. An attribute is an object attached to a parent object that provides additional descriptive information about the parent. The attribute may be a data element representing the quality or state of an object, for example. An attribute may define a particular property of an object, element or file (e.g., manufacturer number, purchase order quantity unit, product hierarchy, etc.). An attribute may also refer to a specific value for a given instance of that property. Age, for example, may be an attribute of the Customer object.

Organizations may use an enterprise resource planning (ERP) software system that helps run the organization, supporting automation and processes in finance, human resources, manufacturing, supply chain, services, procurement, etc. The development group may develop applications to be used by each of these processes and then may use test scripts to test the applications. It is noted that in addition to testing the applications, the test data may be used during demonstrations of the applications to other parties. During execution, the test scripts may access a central data repository of test data. The centralized data may be helpful, as there may be overlap in the data used by the different test scripts, and the centralized data may reduce the amount of data stored by the system (e.g., each group does not need to store its own data). As a non-exhaustive example, the Customer object may be used by finance processes, sales processes, procurement processes, etc., and as such the data is used to create the processes and test their behavior. Consider, as another non-exhaustive example, a sales process. In a sales process, a sales order may be issued. The sales order may be transaction data, and may include a vendor and/or a customer receiving the item being sold in the sales order, etc., The transaction data may be created using master data, including the name of the vendor and/or name of the customer. Master data refers to the characteristics of an object, whereas transaction data refers to all the transactions that are carried out using that object. The master data and transaction data may be used as test data to test the sales process. Once the test data is created and stored, the testing group may be notified and the test data may be consumed by the test scripts.

During execution of the test script, the status of the test data may change. As a non-exhaustive example, the initial stock for a widget may be 30, and after the completion of a purchase transaction, the stock is reduced to 10 widgets. The reduced stock is verified to determine whether the application performed as expected. As another non-exhaustive example, consider the test process to create a Sales Order. The Sales Order Creation process ends when the sales order is transmitted to a Procurement Process. An object of the Sales Order Creation process is the object "Sales Order". Initially, prior to execution of the test script, the status of the Sales Order object is "open". Execution of the test script changes the status of the Sales Order object to "closed" as the completed test has created a Sales Order. The "closed" status is saved for the object, and this status is verified to determine whether the application performed as expected. As yet another non-exhaustive, consider an address in Germany and German bank details for a customer. The test script changes the address to an address in the United States and bank details for the customer to United States bank details, to test all of these fields in the application. In each of these examples the test data has been used during execution of a test script and the test data has been left in a different state from when it was consumed by the test script. The data may be stored in the different state for test verification purposes, for example. This different state may be problematic as the next time the data is consumed by a test script, the test script and/or demonstration may not execute properly because the data is not as expected. Continuing with the changed address/bank details for the customer, the first test script may be for testing compliance with government rules, while the subsequent test script may check a user interface. The subsequent test script expects to have values in the fields for a German address, not fields for a United States address. Similarly, continuing with the widget example, the test script expects 30 widgets in stock and there are only 10.

Additionally, the testers themselves may change data in various systems intentionally e.g., while testing various applications, they may change the state of the test data of specific business objects. Since the data is used by different teams, inconsistency in test data may result in quality issues.

Conventionally the state of test data is managed manually, whereby users manually return the data they changed during testing to an original state or they create a new similar test data set, so the changed data does not impact their regular test activities or other teams using the same system. The manual return of the data results in a cost of resources and may be error-prone. The creation of the new data set comes at a cost of time and resources, as well as a cost for storage, and may result in overloading of the system.

To address these problems, the test data healing tool automatically returns the changed data back to an original state (e.g., heal the data). The test data healing tool restores the attributes for the objects (e.g., Sales Order status, the stock amount) to their first state (open and 30 widgets, respectively) prior to a secondary execution of a test script, so that the test scrips execute with appropriate data. For example, a test script running on a second day to verify regression testing will use the test data in the same state as the data on the first day. Users may create original test data in a machine-readable format and store it in a repository (database) of the test data healing tool, or they may receive test data in a non-machine-readable format and convert it to a machine-readable format. Before the data is stored, it may be validated via a peer review and the user may categorize the test data via unique identifiers (e.g., tags) which may act as a filter for healing. The test data in the repository may act as a reusable and referenceable test data library. Based on the functionality of the application under test, the relevant test data may be pulled out (e.g., per the tags) and made available to the test script and application.

As will be further described below, the test data healing tool defines the structure for the test data in a machine-readable format, allowing the test data to be returned to a first state. The test data healing tool provides an automated data healing process that does not rely on manual reverting of data by testers, ensuring that any changes made to the data in one system are reconciled with the original/first state data and are accurate, resulting in improved data accuracy and consistency. The automation of the data healing process reduces the need for manual data reconciliation by a particular user, which may be a time-consuming and error-prone process. Embodiments provide for the reduction of errors and data inconsistencies that may occur when users make changes to data in one system without realizing the impact on other systems. Pursuant to some embodiments, a user may select which system they would like to undergo data healing, providing for the selection of systems as per the user-needs. Embodiments may improve data governance by providing a standard process for data reconciliation and correction across various teams, helping to ensure that data is accurate and consistent in various systems.

FIG. 1 is a block diagram of a system architecture 100 according to some embodiments. The illustrated elements of system architecture 100 and of all other architectures depicted herein may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more elements of system architecture 100 are implemented by a single computing device, and/or two or more elements of system architecture 100 are co-located. One or more elements of system architecture 100 may be implemented using cloud-based resources, and/or other systems which apportion computing resources elastically according to demand, need, price, and/or any other metric.

System architecture 100 includes a backend server 102 (including an application 118 for a system 114, and processor 120), a test data engineering tool 104, a cloud connector 106, a database 110 and a database management system (DBMS) 112. It is noted that while the test engineering tool 104 is located external to the backend server 102, the is a non-exhaustive example, and the test engineering tool 104 may be located in the backend server 102.

A client/user 116 may interact with the test data engineering tool 104, as described further below. Non-exhaustive examples of users may be administrator/developer, end user, tester, etc. The user 116 may interact with the test data engineering tool 104 via a user interface (e.g., graphical user interface (GUI)). The backend server 102 may provide any suitable interfaces through which users 116 may communicate with the test data engineering tool 104 or application 118 executing thereon. The user interface may be presented via at least one of a user interface program, a user interface server, another system or any other suitable device executing program code of a software application for presenting user interfaces. Presentation of the user interface may comprise any degree or type of rendering, depending on the type of user interface code generated by the application 118. For example, the backend server 102 may execute a Web Browser request and receive a Web page (e.g., in HTML format) via HTTP, HTTPS and/or WebSocket, from an application 118 to provide the UI, and may render and present the Web page according to known protocols. Alternatively, user interfaces may be presented by executing a standalone executable file (e.g., an .exe file) or code (e.g., a JAVA applet) within a virtual machine.

The backend server 102 may include one or more applications 118. Application 118 may comprise server-side executable program code (e.g., compiled code, scripts, etc.) executing within the backend server 102 to receive queries/requests from users 116 and provide results to users 116 based on the data of database 110, and the output of the test data engineering tool 104. As will be described further below, application 118 may comprise web applications which execute to provide desired functionality. User 116 may instruct the system architecture 100, as is known, to execute a test script 122 for an application under test (e.g., application 118) for a system 114, and the test script is executed as described by one or more embodiments, resulting in a change to the test data. The test data engineering tool 104 may subsequently revert the test data to the data in a "right"/"correct" file. The "right"/"correct" data may be referred to herein as "original data".

The test data engineering tool 104 may access data in the database 110 and deploy the original data thereto so that the original data is provided at runtime. While discussed further below, the database 110 may store data representing test scripts 122 and other suitable data. The test scripts ("test executable code") may test functional and non-functional aspects of the applications under test. Database 110 (and other databases herein) represents any suitable combination of volatile (e.g., Random Access Memory) and non-volatile (e.g., fixed disk) memory used by the system to store the data.

One or more applications 118 executing on backend server 102 may communicate with DBMS 112 using database management interfaces such as, but not limited to, Open Database Connectivity (ODBC) and Java Database Connectivity (JDBC) interfaces. These types of applications 118 may use Structured Query Language (SQL) to manage and query data stored in database 110 (and other databases described here).

DBMS 112 serves requests to store, retrieve and/or modify data of database 110, and also performs administrative and management functions. Such functions may include snapshot and backup management, indexing, optimization, garbage collection, and/or any other database functions that are or become known. DBMS 112 may also provide application logic, such as database procedures and/or calculations, according to some embodiments. This application logic may comprise scripts, functional libraries and/or compiled program code. DBMS 112 may comprise any query-responsive database system that is or becomes known, including but not limited to a structured-query language (i.e., SQL) relational database management system.

Database 110 may store data used by at least one of: applications 118 and the test data engineering tool 104. For example, database 110 may store the test scripts 122 for testing the application 118, wherein the test scripts 122 use data deployed by the test data engineering tool for the execution thereof.

Database 110 (and other databases described herein) may comprise any query-responsive data source or sources that are or become known, including but not limited to a structured-query language (SQL) relational database management system. Database 110 (and other databases described herein) may comprise a relational database, a multi-dimensional database, an extensible Markup Language (XML) document, or any other data storage system storing structured and/or unstructured data. The data of database 110 (and other databases described herein) may be distributed among several relational databases, dimensional databases, and/or other data sources. Embodiments are not limited to any number or types of data sources.

Figure 2:
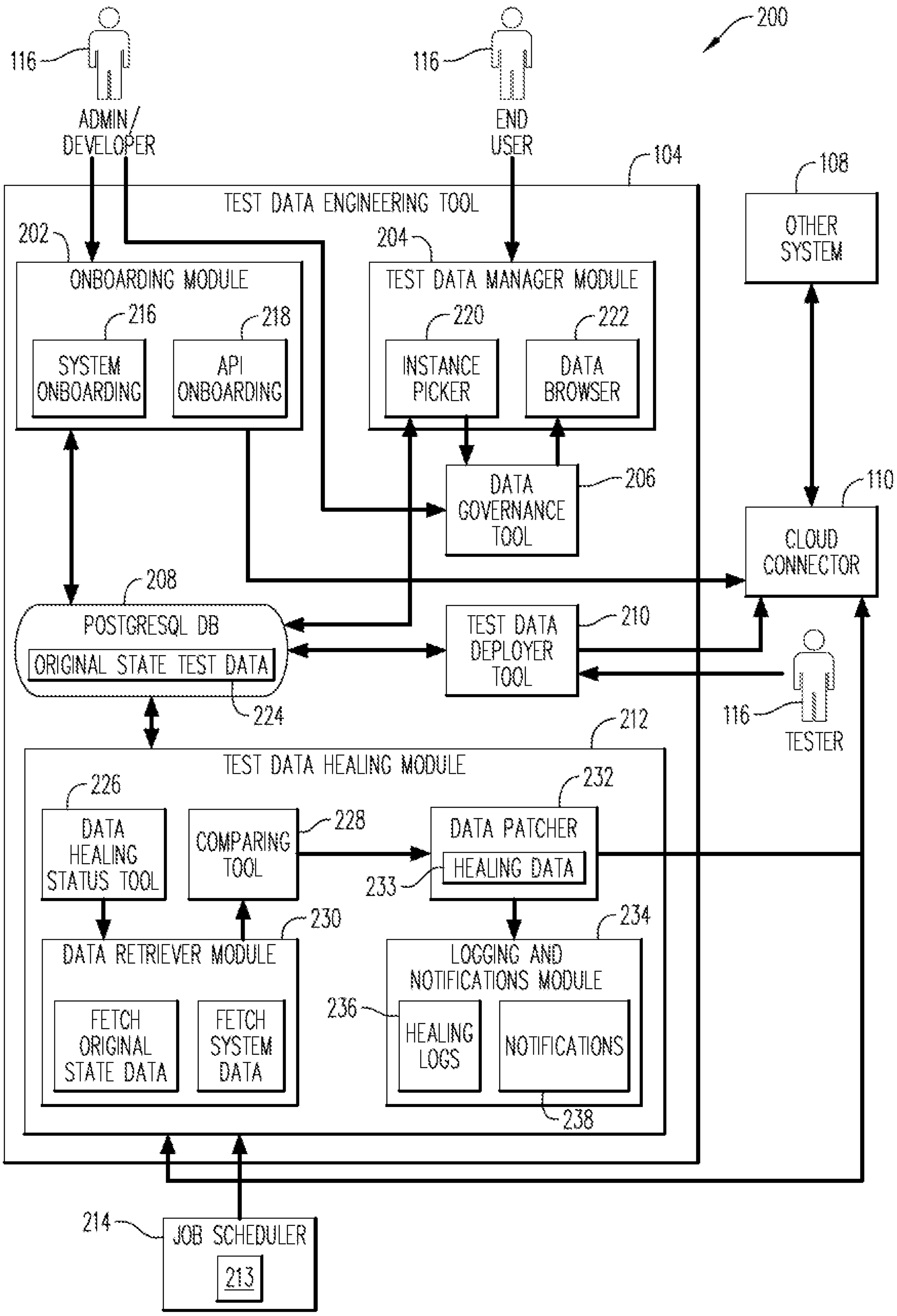
FIG. 2 is a block diagram of an architecture of the test data engineering tool according to some embodiments.

Turning to FIG. 2, a block diagram of an architecture 200 of the test data engineering tool 104 is provided according to some embodiments.

The test data engineering tool 104 may include an onboarding module 202, a test data manager module 204, a data governance tool 206, a PostgreSQL database 208, a test data deployer tool 210, a test data healing module 212 and a job scheduler 214.

The onboarding module 202 may include a system onboarding element 216 and an API onboarding element 218. The system onboarding element 216 may onboard (e.g., establish a connection) business systems including applications to be tested with the test data engineering tool 104, while the API onboarding element 218 may onboard (e.g., establish a connection) business Application Programming Interfaces (APIs) with the test data engineering tool 104, as described further below with respect to FIGS. 9-11. The onboarding module 202 may establish a connection between the business system or API of the testing system with the test data engineering tool 104 so that the modules and elements of the test data engineering tool 104 know where data is available, how to access the data, how to connect with that data, how to heal the data and how to communicate with the test system. Pursuant to some embodiments, the test data engineering tool 104 may be in a cloud platform and the applications under test may be on-premise or on another cloud platform.

The test data manager module 204 may include an instance picker 220 and a data browser 222. The instance picker 220 may be used to define the test data that will be deployed and healed (e.g., returned to original state test data). Pursuant to some embodiments, the instance picker 220 may generate a user interface (not shown) that displays the data for a particular business object within a particular system. The displayed data may be in table format or machine-readable format, and an authorized user may set the attribute values to the original state test values. In order to save the set attribute values, the user may be presented with a window whereby they may select at least a reviewer email. The window may also provide the user with an opportunity to map the values to at least one tag. The set attribute values may then be transmitted to the reviewer email (as part of the data governance tool 206) for final approval as original state test values before the values are uploaded to the PostgreSQL database 208. The instance picker 220 may also be used to convert the test data into a machine-readable (e.g., JSON) format. Other suitable machine-readable formats may be used. The data browser 222 may contain an original copy of user data.

The data governance tool 206 may provide for the designation of data as the "original state" or version of the data. The data governance tool 206 may receive designation of data as the original state via approval of a governing group of users or other suitable user.

The PostgreSQL database (DB) 208 may be a repository storing the original state test data 224. While a PostgreSQL database is shown herein, other suitable databases may be used.

The test data deployer tool 210 may deploy or send the original state test data 224 to a central repository (e.g., database 110) for use by the systems 114 for testing, where the data is sent via the cloud connector 106. The test data deployer tool 210 may by used by end users 116, for example, to deploy data from one system to another system.

The test data healing module 212 may include a data healing status tool 226, a comparing tool 228, a data retriever module 230, a data patcher 232 and a logging and notifications module 234.

The data healing status tool 226 may check the onboarded systems included in a job to identify the systems that have a selected status of "data healing" (as opposed to not having "data healing" selected). The selected status may be stored in the database 208.

The comparing tool 228 may compare the original state test data 224 to the data in the database 110 after the test execution to check for any differences therebetween. The comparing tool 228 may receive the data from the data retriever module 230.

The data retriever module 230 may fetch the original state test data 224 (e.g., original copy of the data stored in the database 208) as well as fetch the data in the central repository database 110 stored after the test execution (e.g., system data).

The data patcher 232 may receive notification from the comparing tool 228 that the data has changed. The data patcher 232 may then restore the changed data in the central repository database 110 to the original state test data by making a PATCH call via APIs stored in the database 208, to deploy the original state test data to the database 110. As used herein, PATCH is used to make a partial update to an existing resource. In response to the PATCH call to update a resource, the server will only update the specified fields in the existing resource, so that only data in those fields that do not match the original state test data are changed so that they do match the original state test data.

The logging and notifications module 234 may receive a notification from the data patcher 232, that the data has been healed. This notification may be stored in a healing log 236. Additionally, this notification may trigger the automatic transmission of a notification 238 (e.g., e-mail, text, etc.) to a user 116.

The job scheduler 214 may execute a job 213. The job 213 may check whether the state of the data in the database 110 has been changed from the original state test data or not per the test data healing module 212. The job scheduler 214 may schedule the job 213 to run at a specified time and day. As a non-exhaustive example, the job 213 may be run on a daily basis, weekly basis, hourly basis, etc. The date/time may be set by an administrator. At the date/time set by the job scheduler 214, the test data healing module 212 executes the data healing status tool 226, the comparing tool 228, the data retriever module 230, the data patcher 232 and the logging and notifications module 234, as described herein.

Figure 3:
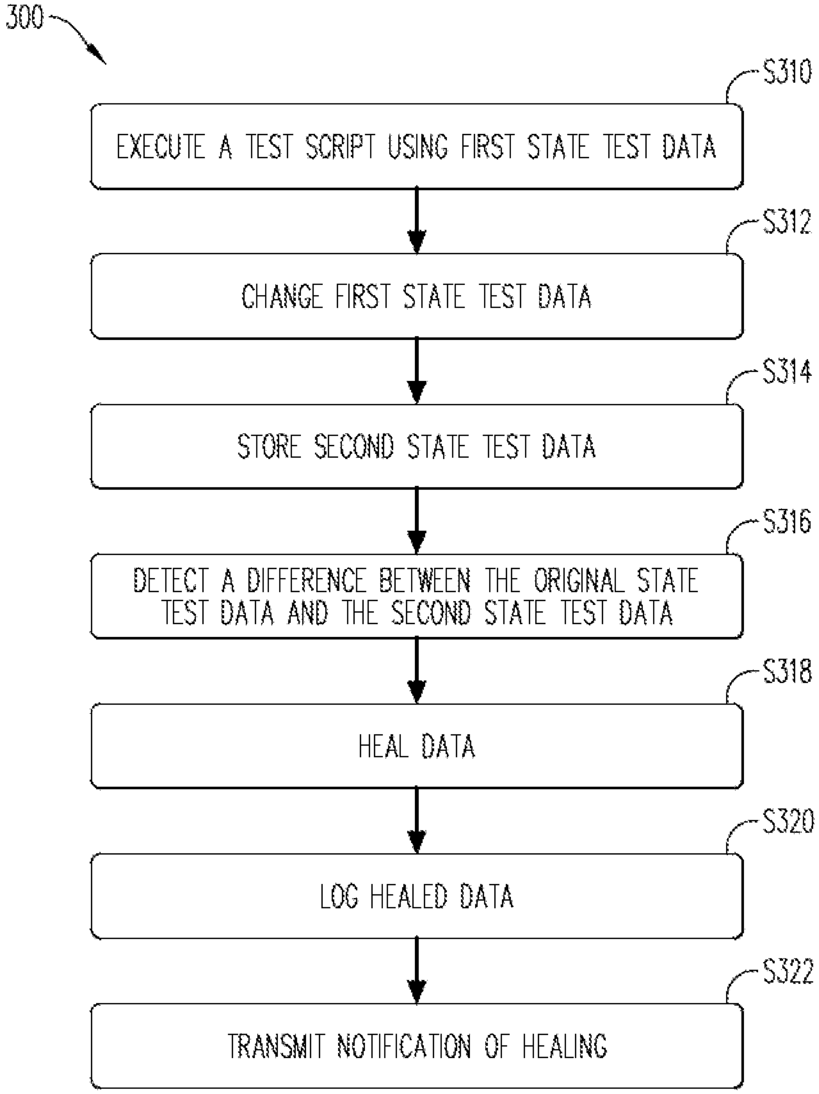
FIG. 3 is a flow diagram of a process according to some embodiments.

FIG. 3 illustrates a process 300 for healing data in accordance with an example embodiment. The process 300, and other processes described herein, may be performed by a database node, a cloud platform, a server, a computing system (user device), a combination of devices/nodes, or the like, according to some embodiments. In one or more embodiments, the system architecture 100/200 may be conditioned to perform the process 300, and other processes described herein, such that a processing unit 1335 (FIG. 13) of the system architecture 100/200 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

The process 300 described by FIG. 3 is a high level description, and further details are described below with respect to FIGS. 4-7.

Prior to the process 300, data is designated as original state test data 224.

Initially, at S310, a test script 122 is executed using deployed test data 124 from the database 110. The test script 122 may be a functional test and may be executed by the system 114 to test a functional aspect of an application under test. The functional test is a type of software testing that verifies the application behaves according to specified functional requirements (e.g., validating if an application works as intended). The functional test involves testing the input and output, data manipulation, user interactions and the application's response to various scenarios and conditions. The test data 124 used in the execution of the test script is representative of the original state test data 224. Herein the deployed test data used in the execution may be referred to as "first state test data". As described above, the original state test data 224 is in a state that has been designated as "original" or "right" by the data governance tool 206. The test data deployer tool 210 may have previously retrieved a copy of the original state test data 224 from the database 208 to send (deploy) to the database 110 via the cloud connector 108 as first state test data 124.

Figure 4:
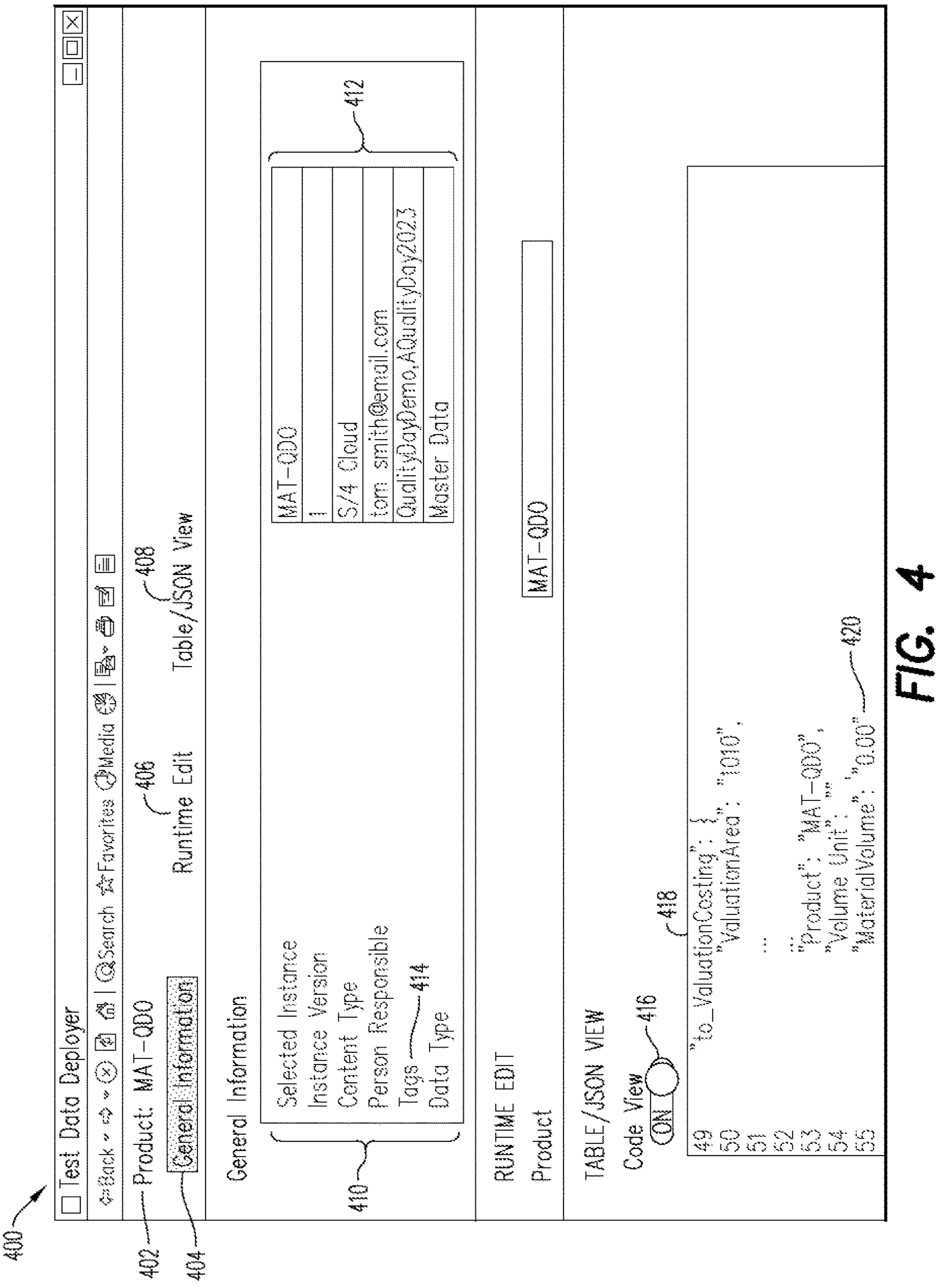
FIG. 4 is a diagram illustrating a user interface according to some embodiments.

FIG. 4 is user interface 400 for a particular business object type provided by the test data deployer tool 210. Here, the business object is a product 402, and specifically, the product "MAT-QD0". The user interface 400 may include a General Information tab 404, a Runtime Edith tab 406 and Table/JSON view tab 408. The tabs may allow the user 116 to navigate to a particular section of the user interface 400. Here, the General Information tab 404 is selected as indicated by the shading. In some embodiments, selection of the General Information tab 404 may only display the General Information or may display the information for each of the tabs in different sections, as shown in FIG. 4.

The General Information tab 404 may include one or more fields 410 and associated values 412 for this product 402. The fields 410 may include, but are not limited to, a Selected Instance (data of the actual business object), an Instance Version, a Content Type, a Person Responsible (email address), a Tag, and a Data Type (Master or Transactional). The tag 414 may represent a set of data (master data and transaction data) that needs to be deployed together for a particular system. The data represented by the tag belongs to a particular stack. The tag 414 allows the test data engineering tool 104 to easily identify a set of data for healing. In the non-exhaustive example shown herein, the tags are "QualityDayDemo" and "AQualityDay2023". For healing, the system will heal all of the fields included in these tags.

The Runtime Edit tab 406 displays the business object that will be tested, and may be manually edited for the runtime of the test script. It is noted that even with a manually edited runtime, the healing will still occur automatically.

The Table/JSON view tab 408 displays the data for the business object in one of a table view or a JSON view. The view may be selected via a Code View toggle 416. Here, the Code View toggle 416 is set to show the JSON view 418 for the business object. The attribute values 420 may initially be populated with the original state test data 224, and may be edited manually or automatically per the test.

Figure 5:
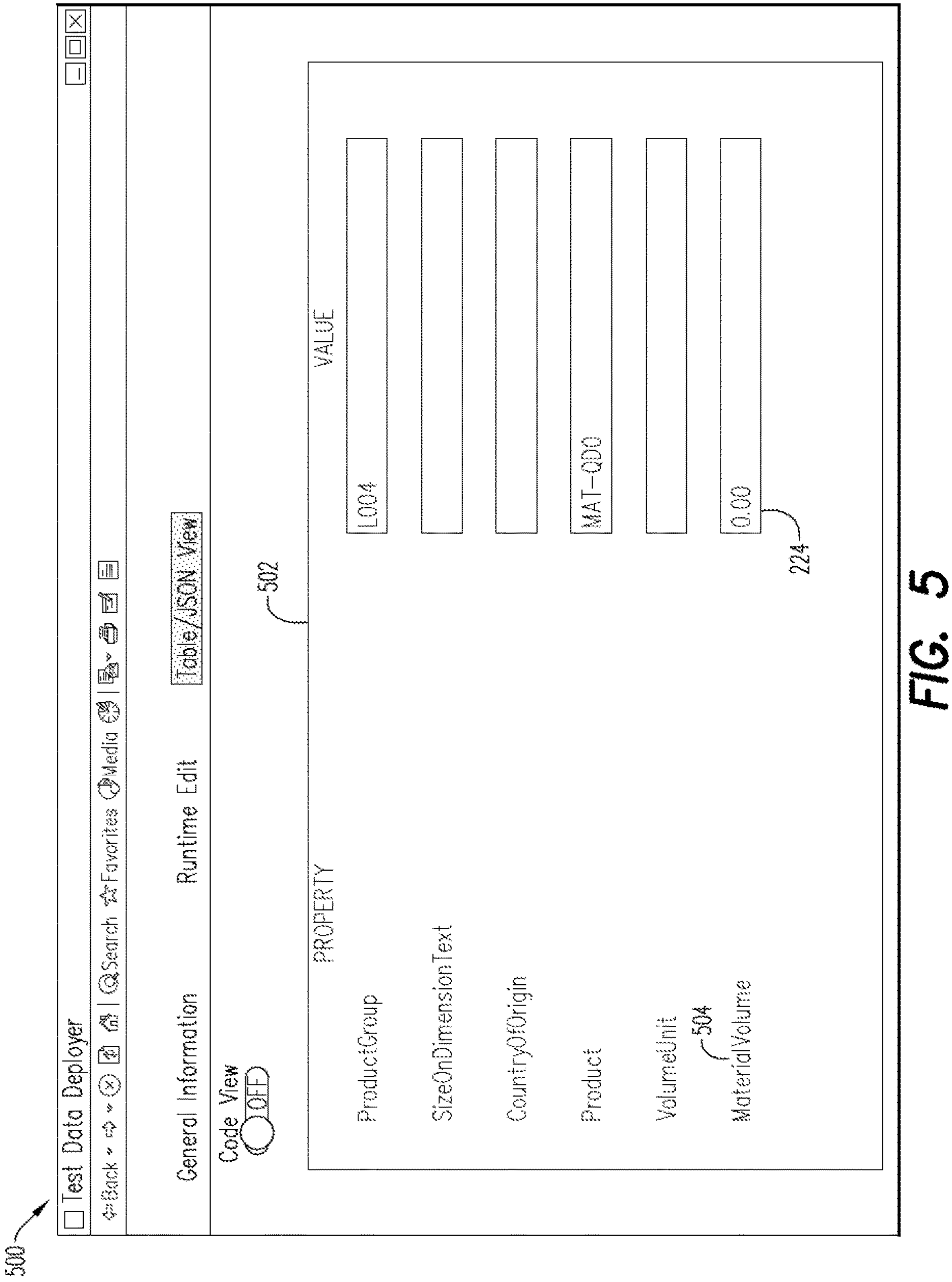
FIG. 5 is a diagram illustrating a user interface according to some embodiments.

FIG. 5 is a Table/JSON user interface display 500 in response to selection of the Table/JSON view tab 408. Here, the Code View toggle 416 is set to show the table view 502. The JSON view 418 shown in FIG. 4 and the table view 502 shown in FIG. 5 are different representations of the same data.

Turning back to the process 300, in S312, the first state test data is changed in response to execution of the test script 122 (test executable code). The first state test data is received by the test script 122, execution of the test script 122 changes the data, such that after execution of the test script 122 the first state test data no longer represents the original state test data and instead is in a second state, different from the first state, and may be referred to as "other system data" or "second state test data."

The second state test data may be stored by the database 110 as the test data in S314. The second state test data may replace the first state test data and may be stored to validate that the test.

Figure 6:
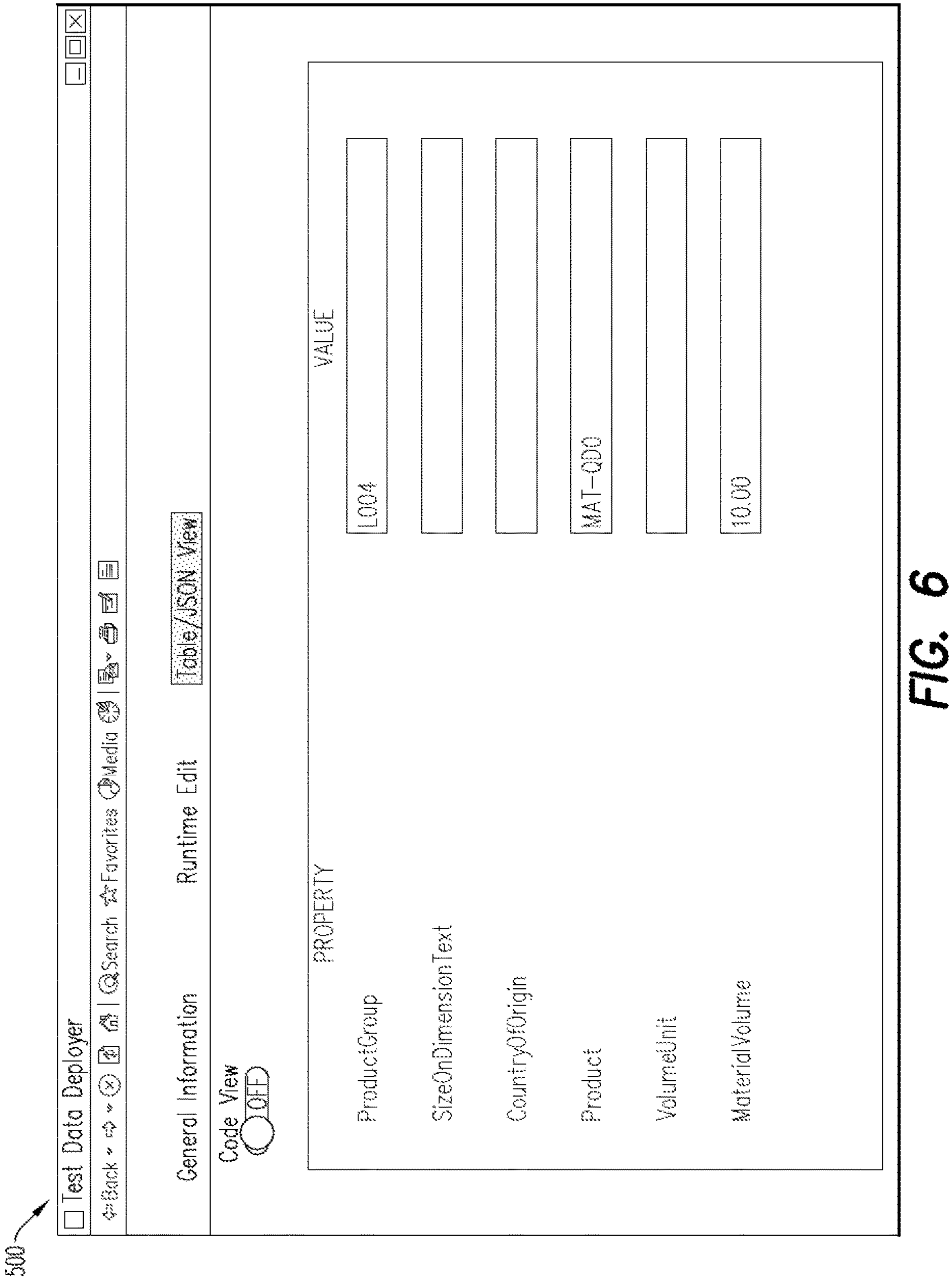
FIG. 6 is a diagram illustrating a user interface according to some embodiments.

Continuing with the non-exhaustive example described above, in FIG. 5, the original state test data for the MaterialVolume field 504 is set to an attribute value of "0.00". This data is deployed as the first state data to the test script 122. After execution of the test script 122, the first state test data of attribute "0.00" has changed to a second state test data of attribute "10.00", as shown in FIG. 6. The "10.00" is stored so that the execution of the test script may be validated (e.g., "10.00" was expected as the output of the executed script, and "10.00" is the stored value).

Figure 7:
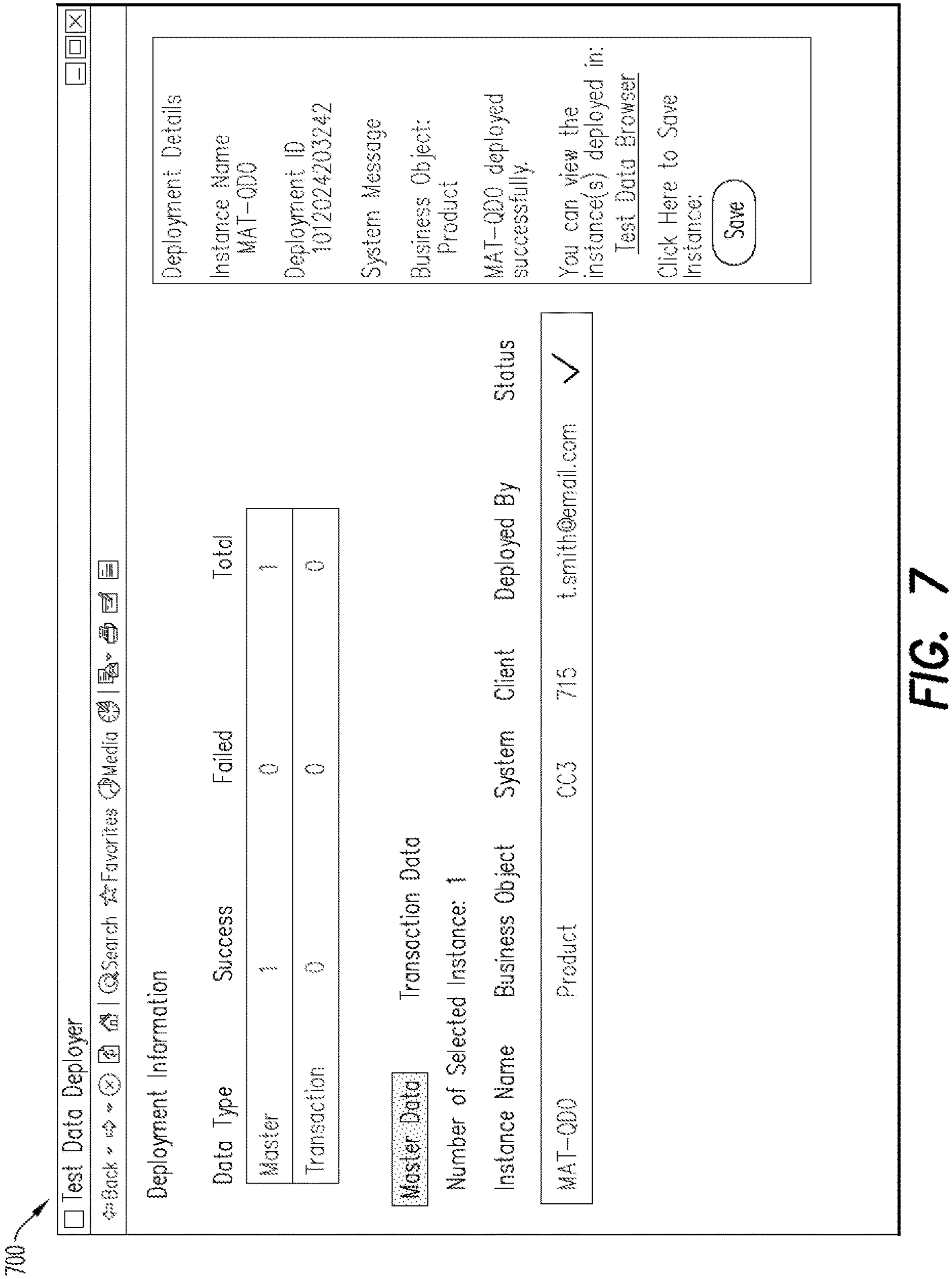
FIG. 7 is a diagram illustrating a user interface according to some embodiments.

FIG. 7 is a deployment information user interface 700. The deployment information user interface 700 may include a summary of the data sent to the database 110 for testing. Continuing with the non-exhaustive example, the test is creating the product.

Following S314, a difference between the first state test data and the second state test data is detected in S316. The difference may be detected by the job 213 executed by the job scheduler 214, as described further below with respect to FIG. 8.

Then, in S318 the data patcher 232 may receive notification of the detected difference and heal the test data in the database 110 to the original state test data represented by the first state by re-deploying the first state test data to the database 110, as described above.

In S320, the detected difference and healing data 233 are stored in the healing log 236 by the logging and notification module 234. In S322, the detected difference and healing data 233 may be presented in a readable model via notifications 238 transmitted to one or more users that have scheduled the job 213 or any other suitable user. The healing data 233 may include the object healed and the attribute healed for that object. It is noted that at least the order of S320 and S322 may be reversed or may occur at the same time or substantially the same time.

Figure 8:
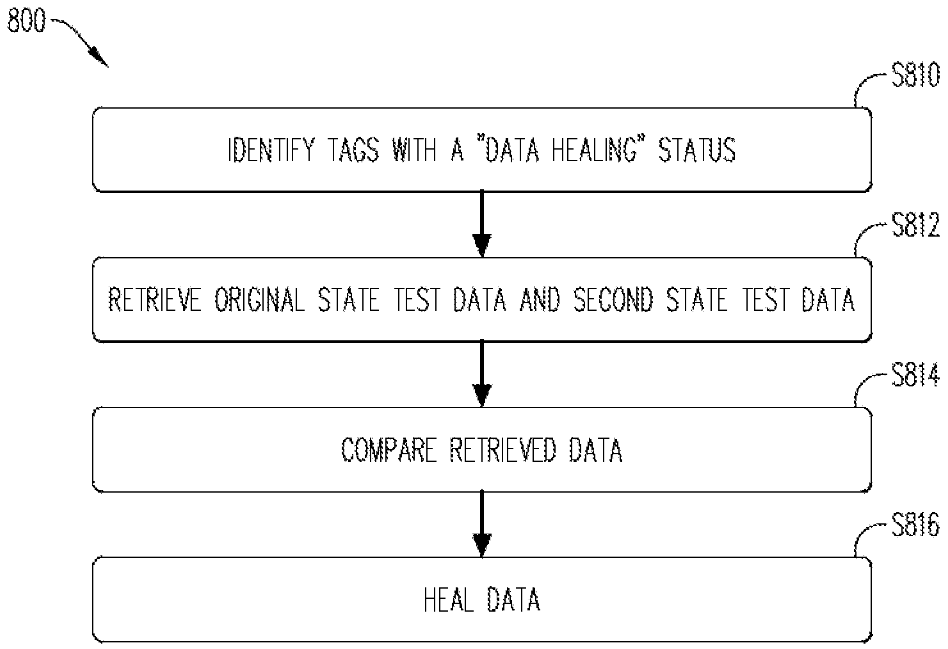
FIG. 8 is a flow diagram of a process according to some embodiments.

Turning to FIG. 8, a process 800 for execution of the job is provided in accordance with an example embodiment.

Prior to process 800, the execution of the job 213 is triggered by the job scheduler 214. Initially at S810, tags having a "data healing" status are identified by the data status healing tool 226. The data status healing tool 226 may receive a list of systems for which tests have been executed since the previous execution of the job. The data status healing tool 226 may identify the tags 414 for the data that has been used by these systems in the list, and may further identify which of these tags has a status of "data healing". The selected status may be stored in the database 208.

In a case the status is "data healing," the data status healing tool 226 sends a request to the data retriever module 230. In response to the received request, the data retriever module 230 retrieves/fetches the original state test data 224 and the second state (system) data from the database 110 in S812. The data is retrieved for all of the object instances for the particular tags. The retrieved data is sent to the data patcher 232. The comparing tool 228 analyzes the original state test data 224 via comparison to the second state data in S814. Pursuant to some embodiments, the comparing tool 228 may use an in-built Java function to compare the whole original state JSON file for the business object to the whole second state JSON file for the business object. In other embodiments other suitable comparison tools may be used.

Upon identification of a difference, the comparing tool 228 may transmit the identified difference to the data patcher 232. The data patcher 232 automatically heals the data in S816, by re-deploying the first state test data representing the original state test data, and replacing the second state test data with the first state test data, such that the first state test data is again ready for use by a test script 122.

Figure 9:
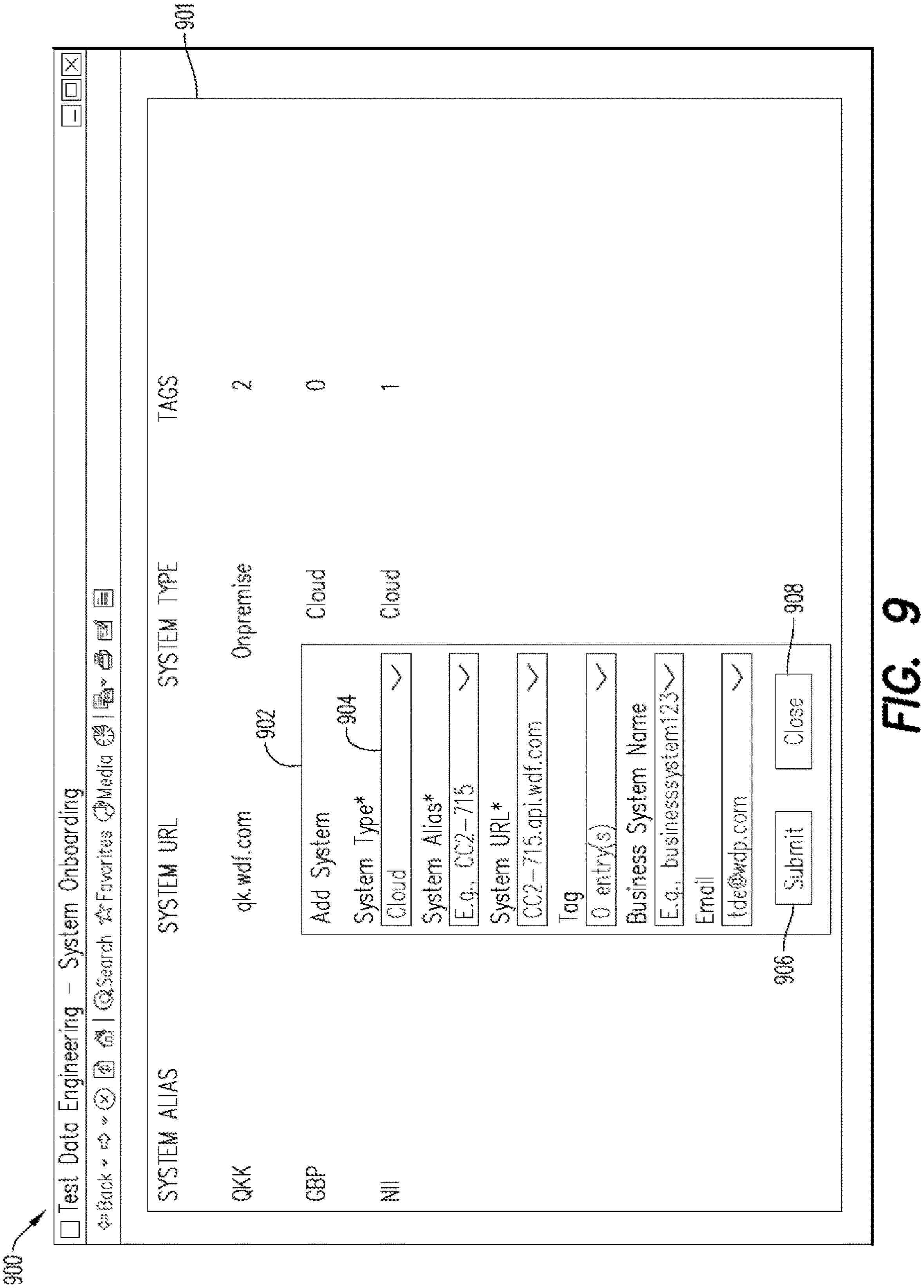
FIG. 9 is a diagram illustrating a user interface according to some embodiments.

FIG. 9 is an onboarding user interface display 900 according to one or more embodiments. The onboarding user interface display 900 may be provided by the onboarding module 202. While the example shown herein is for onboarding a system per the system onboarding element 216, the process for onboarding an API per the API onboarding element 218 is similar. As described above, the system onboarding element 216 may onboard (e.g., establish a connection) business systems including applications to be tested with the test data engineering tool 104, while the API onboarding element 218 may onboard (e.g., establish a connection) business Application Programming Interfaces (APIs) with the test data engineering tool 104. The data patcher 232 may use the onboarded APIs to heal the data. As a non-exhaustive example, the system may use the APIs to convert the data between the machine-readable JSON file format and another format that is consumed by the test scripts. The onboarding user interface display 900 may include a table 901 of onboarded systems. The table 901 may include, for each system, a system alias, system Uniform Resource Locator (URL), system type, and tags. Other suitable information may be included for each system.

The onboarding user interface display 900 may also include a pop-up window 902 whereby a user may enter data into user-entry fields 904 to onboard the system. As a non-exhaustive example, the pop-up window 902 may include, but is not limited to, user-entry fields 904 for System Type (e.g., Cloud, Docker Onpremise, VLAB, etc.), System Alias, System URL (e.g., how to connect to the system), Tags, Business System Name and Email (contact for the system). The user-entry field may be a drop-down menu, text-entry field, selectable radio buttons, etc. The pop-up window 902 may also include a "submit" icon 906 and a "close" icon 908.

Figure 10:
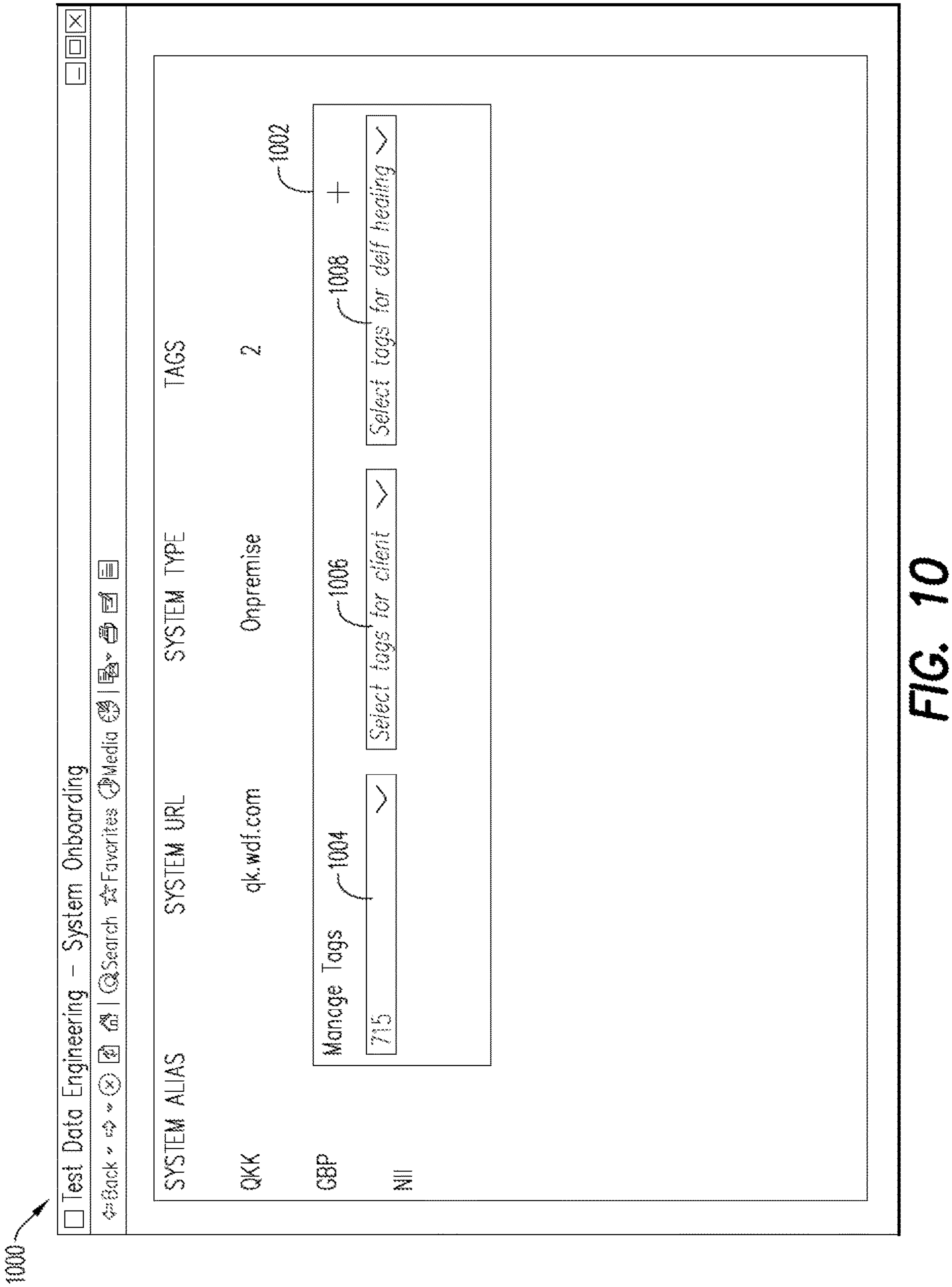
FIG. 10 is a diagram illustrating a user interface according to some embodiments.
Figure 11:
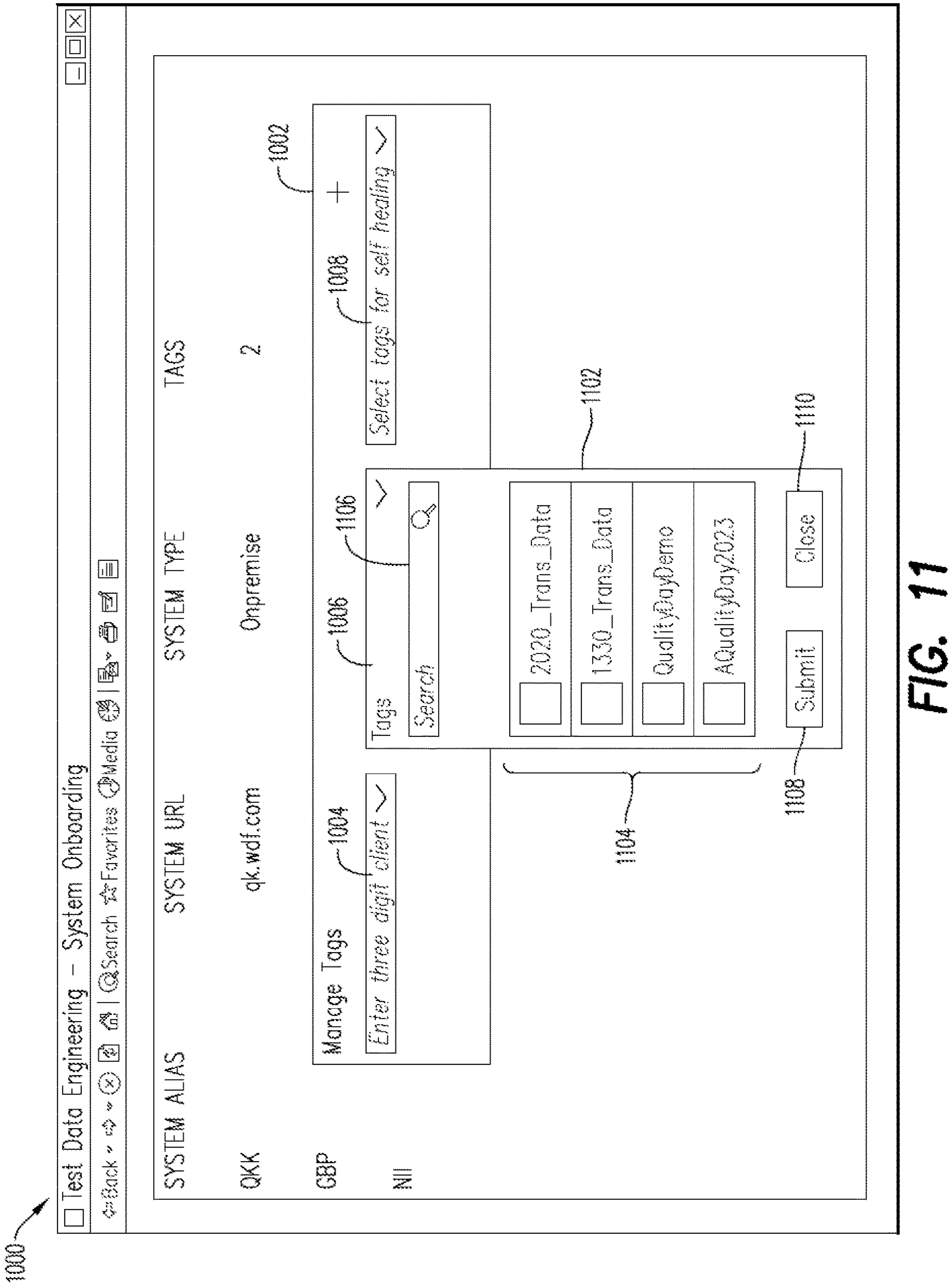
FIG. 11 is a diagram illustrating a user interface according to some embodiments.

FIG. 10 is an onboarding user interface display 1000 including a Manage Tag pop-up window 1002 according to one or more embodiments. As described above, tags are a label/placeholder for a set of data (master data and transaction data) that needs to be deployed for a particular system. The Manage Tag pop-up window 1002 may include a "Client Number" entry field 1004, a "Select Tags" entry field 1006 and a "Select Tags for Self Healing" entry field 1008. The user may enter a client number (e.g., 715) in the Client Number entry field 1004 and then may select tags to associate with the client via the Select Tags entry field 1006, and may select tags for self healing via the Select Tags for Self Healing entry field 1008. Selection of either the Select Tags entry fields 1006 and the Select Tags for Self Healing entry fields 1008 may result in a Tags drop-down menu 1102 (FIG. 11). The Tags drop-down menu 1102 may include a plurality of selectable tags 1104. The Tags drop-down menu 1102 may also include a search bar 1106, a select icon 1108 and a close icon 1110. As a non-exhaustive example, selection of the "AQualityDay2023" tag 1104 will include particular data for deployment in this system per the Select Tags entry field 1006, and will include particular data for healing in this system per the Select Tags for Self Healing entry field 1008. With respect to healing, the test data healing module 212 may heal all of the data belonging to the QualityDay2023 tag 1104.

Figure 12:
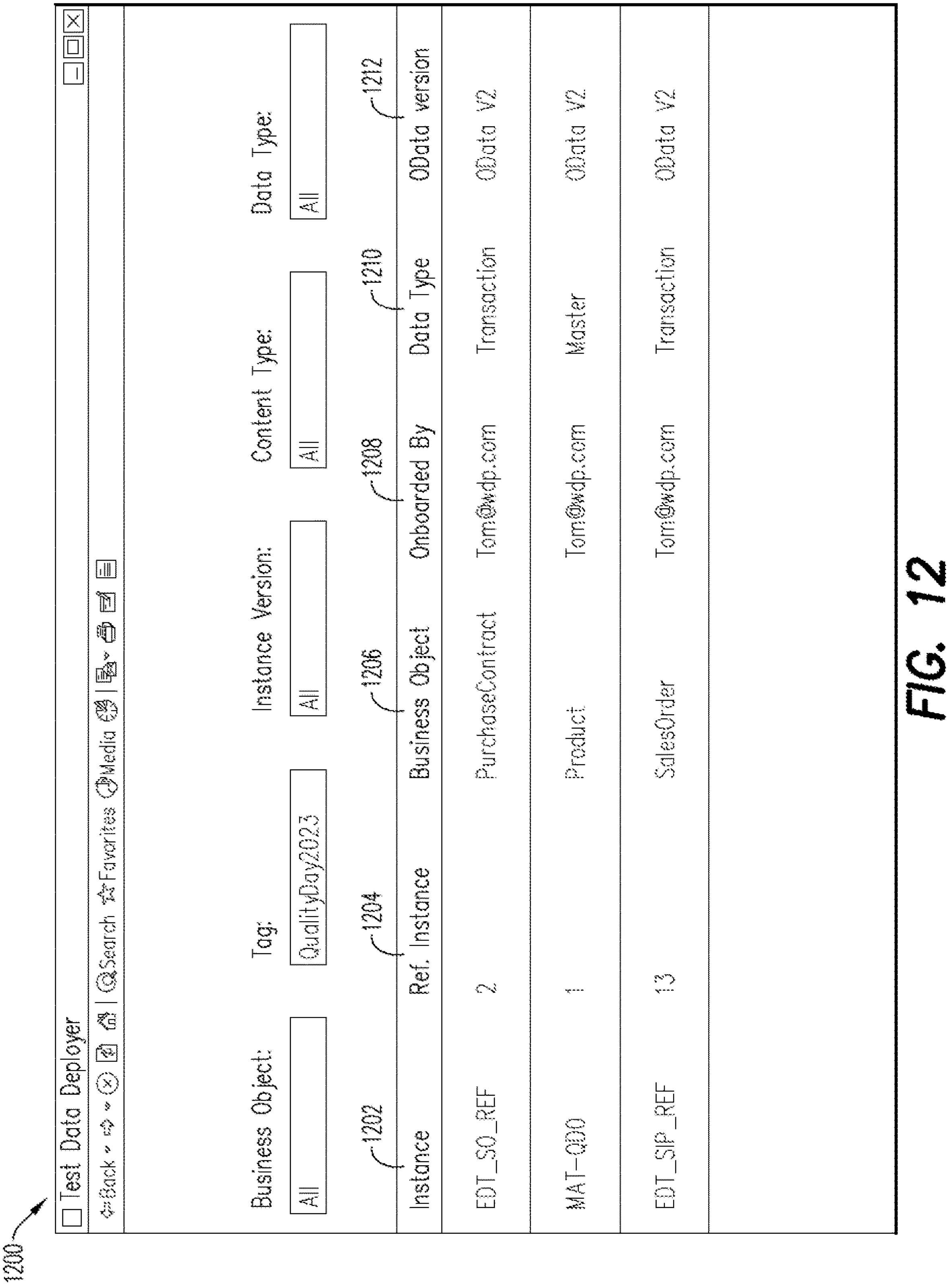
FIG. 12 is a diagram illustrating a user interface according to some embodiments.

FIG. 12 is a test data deployer user interface 1200. As shown herein, for the Tag "QualityDay2023", there are three instances that are stored as machine-readable JSON files. In a case the Tag "QualityDay2023" is selected for healing as described above, all of the business objects that are mapped to the tag (e.g., PurchaseContract, Product, SalesOrder in the non-exhaustive example shown herein) are healed. It is noted that prior to storage in the test data engineering tool 104, the data for the business objects and object instances is converted to JSON format by the test data engineering tool 104. The test data deployer user interface 1200 includes an instance name 1202, a version number (Ref. instance) 1204, business object 1206, an onboarded by 1208, a data type 1210 (transaction or master), and an OData version 1212. The version number 1204 indicates the version that is marked as the original state test data. The version number indicates to the system that if someone is changing this business object, the data needs to be healed to this listed version state. In some instances, a group may want to use a particular version for their testing, which may be different from the original state test data stored in the central repository, as described above. In that case, the executed test script may be very localized. After execution of the test, the data will still be healed to the original state test data. Selection of the instance name 1202 "MAT-QS0" may result in the user interface 400 shown in FIG. 4, including the JSON file that provides the structure for that product.

Figure 13:
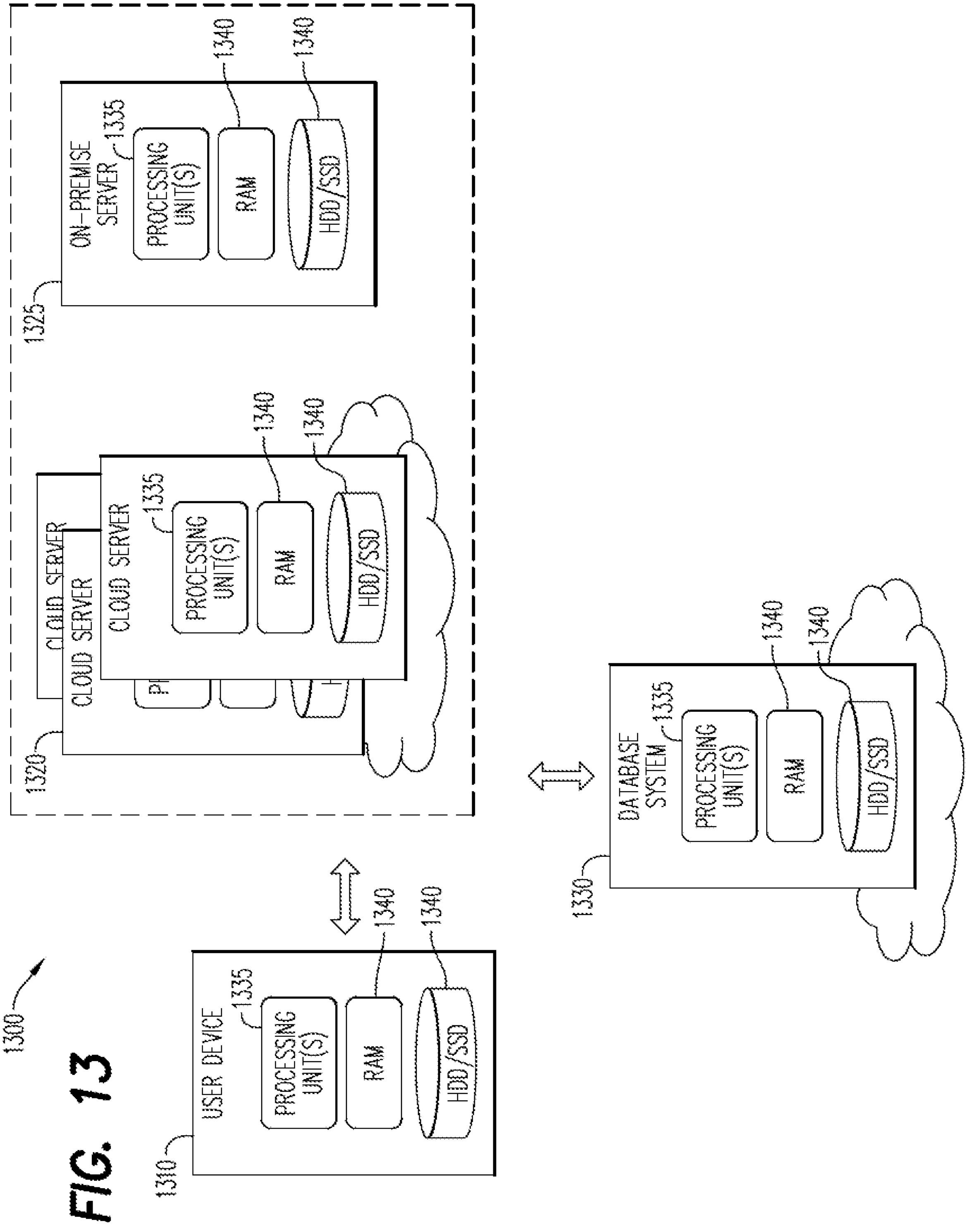
FIG. 13 is a block diagram of a cloud-based database deployment architecture according to some embodiments.

FIG. 13 illustrates a cloud-based database deployment 1300 according to some embodiments. The illustrated components may reside in one or more public clouds providing self-service and immediate provisioning, autoscaling, security, compliance and identity management features.

User device 1310 may interact with applications executing on one of the cloud application server 1320 or the on-premise application server 1325, for example via a Web Browser executing on user device 1310, in order to create, read, update and delete data managed by database system 1330. Database system 1330 may store data as described herein and may execute processes as described herein to cause the execution of the test data engineering tool 104 for use with the user device 1310. Cloud application server 1320 and database system 1330 may comprise cloud-based compute resources, such as virtual machines, allocated by a public cloud provider. As such, cloud application server 1320 and database system 1330 may be subjected to demand-based resource elasticity. Each of the user device 1310, cloud server 1320, on-premise application server 1325, and database system 1330 may include a processing unit 1335 that may include one or more processing devices each including one or more processing cores. In some examples, the processing unit 1335 is a multicore processor or a plurality of multicore processors. Also, the processing unit 1335 may be fixed or it may be reconfigurable. The processing unit 1335 may control the components of any of the user device 1310, cloud server 1320, on-premise application server 1325, and database system 1330. The storage devices 1340 may not be limited to a particular storage device and may include any known memory device such as RAM, ROM, hard disk, and the like, and may or may not be included within a database system, a cloud environment, a web server or the like. The storage device 1340 may store software modules or other instructions/executable code which can be executed by the processing unit 1335 to perform the method shown in FIGS. 3/8. According to various embodiments, the storage device 1340 may include a data store having a plurality of tables, records, partitions and sub-partitions. The storage device 1340 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:

a test data repository storing test data;

a memory storing processor-executable program code; and a processing unit to execute the processor-executable program code to cause the system to:

change a state of the stored test data for one or more business objects from a first state to a second state in response to execution of test executable code, the execution using the first state test data;

store the second state test data;

detect a difference between the first state test data and the second state test data by comparing the stored second state test data to the first state test data;

identify data healing tags mapped to one or more business objects; and restore the stored second state test data to the first state test data for the one or more business objects mapped to the identified data healing tags.

2. The system of claim 1, wherein the difference is detected by a job.

3. The system of claim 2, wherein the job is executed in response to a trigger.

4. The system of claim 3, wherein the trigger is one of: a schedule and the storing of the second state test data.

5. The system of claim 1, wherein the stored test data is validated by a data governance tool prior to execution of the test executable code.

6. The system of claim 5, wherein the validated data is stored in the test data repository in a machine-readable format.

7. The system of claim 1, further comprising processor-executable program code to cause the system to:

convert the test data to a machine-readable format from a non-machine-readable format prior to storage in the test data repository.

8. The system of claim 1, wherein the execution of test executable code using the first state test data is via a testing application external to the system.

9. The system of claim 8, further comprising processor-executable program code to cause the system to:

automatically establish a connection with the testing application based on data received from an onboarding process.

10. The system of claim 9, wherein the data received from the onboarding process includes at least one of a testing application system type, a testing application system Uniform Resource Locator (URL), and a testing application system identifier.

11. The system of claim 9, wherein a tag is received via the onboarding process and the tag identifies objects of the stored test data for restoration to the first state.

12. A computer-implemented method comprising:

changing a state of stored test data for one or more business objects from a first state to a second state in response to execution of test executable code via a testing application, the execution using the first state test data;

storing the second state test data;

detecting a difference between the first state test data and the second state test data by comparing the stored second state test data to the first state test data;

identifying data healing tags mapped to the one or more business objects; and restoring the stored second state test data to the first state test data for the one or more business objects mapped to the identified data healing tags.

13. The method of claim 12, wherein the difference is detected by a job.

14. The method of claim 13, wherein the job is executed in response to a trigger.

15. The method of claim 12, wherein the stored test data is validated master data.

16. The method of claim 15, wherein the validated test data is stored in a test data repository in a machine-readable format.

17. The method of claim 12, further comprising:

converting the test data to a machine-readable format from a non-machine-readable format prior to storage in a test data repository.

18. A non-transitory computer readable medium having executable instructions stored thereon to perform a method, the method comprising:

changing a state of stored test data for one or more business objects from a first state to a second state in response to execution of test executable code via a testing application, the execution using the first state test data;

storing the second state test data;

detecting a difference between the first state test data and the second state test data by comparing the stored second state test data to the first state test data;

identifying data healing tags mapped to the one or more business objects; and restoring the stored second state test data to the first state test data for the one or more business objects mapped to the identified data healing tags.

19. The medium of claim 18, wherein the difference is detected in response to a trigger.

20. The medium of claim 18, wherein the stored test data is validated data.

* * * * *